United States Patent

[11] 3,554,104

[72] Inventors Alfred Winkler
Munich;
Karl Wagner, Ottobrunn, near Munich,
Dieter Engelsmann, Unterhaching near
Munich, and Rolf Schroeder, Munich,
Germany
[21] Appl. No. 722,466
[22] Filed Apr. 18, 1968
[45] Patented Jan. 12, 1971
[73] Assignee Afga-Gevaert Aktiengesellschaft
Leverkusen, Germany
[32] Priority May 5, 1967, Dec. 22, 1967
[33] Germany
[31] A55,629 and A57,780

[54] EXPOSURE CONTROL FOR PHOTOGRAPHIC CAMERAS
25 Claims, 3 Drawing Figs.
[52] U.S. Cl. ........................................................ 95/10, 95/64
[51] Int. Cl. ........................................................ G03b 7/08, G03b 7/12

[50] Field of Search............................................. 95/10C, 53, 64C

[56] References Cited
UNITED STATES PATENTS
2,978,970  4/1961  Fahlenberg.................. 95/10(C)
3,072,028  11/1963  Lange........................... 95/10(C)
3,457,844  7/1969  Kitai............................. 95/10(C)

*Primary Examiner*—John M. Horan
*Assistant Examiner*—Joseph F. Peters, Jr.
*Attorney*—Michael S. Striker

ABSTRACT: An exposure control for photographic cameras wherein the electrical delay circuit for the shutter is adjustable by way of a manually operated first selector which simultaneously adjusts a regulating device serving to adjust the sensitivity of an exposure meter for the diaphragm. A second manually operated selector can be used to adjust the diaphragm independently of or by way of the exposure meter. Alternatively, the first selector can also serve to adjust the diaphragm at the will of the user.

Fig.1

INVENTORS
ALFRED WINKLER
KARL WAGNER
DIETER ENGELSMANN
ROLF SCHRÖDER

BY
Michael S. Striker
Attorney

Fig.3

INVENTORS.
ALFRED WINKLER
KARL WAGNER
DIETER ENGELSMANN
ROLF SCHRÖDER

3,554,104

EXPOSURE CONTROL FOR PHOTOGRAPHIC CAMERAS

BACKGROUND OF THE INVENTION

The present invention relates to photographic cameras in general, and more particularly to improvements in exposure controls for photographic cameras. Still more particularly, the invention relates to improvements in exposure controls wherein one of the exposure values (e.g., the aperture size defined by an adjustable diaphragm) is a function of the other exposure value (e.g., of the exposure time) and wherein the exposure time is determined by an electrical delay circuit.

It is already known to provide a photographic camera with an exposure control which can furnish a large number of exposure times within a wide range, for example, a range of exposure times between 16 seconds and one five-hundredths of a second. It is also known to select the exposure time as a function of scene brightness and as a function of a manually selected aperture size. A drawback of such exposure controls is that they can be properly manipulated by skilled photographers but are not readily understandable to beginners or unskilled persons. Thus, a beginner is not likely to understand the influence of the aperture size on the quality of exposures, and such beginner is equally unlikely to have a full knowledge of the influence of exposure times on the exposure. Furthermore, such exposure controls are not provided with means for indicating the automatically determined exposure time when the aperture size is selected by hand.

Certain recent types of exposure controls already comprise a shutter which is controlled by an electrical delay circuit, and an exposure meter. The needle of a moving coil instrument in the exposure meter changes its position in dependency on changes in scene brightness and constitutes the sliding contact of a variable resistor which determines the exposure time as a function of scene brightness. Furthermore, the needle can be observed behind a window and indicates the exposure times on a graduated scale. The entire moving coil instrument is turnable by a selector which is manipulated by hand to adjust the diaphragm. Proper adjustments of the diaphragm are facilitated by a scale whose graduations indicate various depths of field. In this way, the moving coil instrument is adjusted in dependency on the selected aperture size and its needle thereupon adjusts the variable resistor to select an exposure time which is a function of scene brightness and a function of the selected aperture size. A serious drawback of such exposure controls is that changes in scene brightness which occur subsequent to manual adjustment of the diaphragm result in changes in exposure time. Thus, and if the intensity of scene light decreases suddenly after the operator completes the adjustment of the diaphragm, the exposure is made with an exposure time which might be much longer than the originally contemplated exposure time and might be too long for making exposures with the camera held by hand. Furthermore, such exposure controls do not permit a selection of exposure times and aperture sizes independently of the intensity of scene light. This is due to the fact that the exposure time is always a function of scene brightness.

SUMMARY OF THE INVENTION

It is an object of our invention to provide an improved exposure control for photographic cameras wherein the exposure time can be selected by hand and such selection of exposure time influences the aperture size, or vice versa.

Another object of the invention is to provide an exposure control which can furnish a large number of exposure times and aperture sizes, wherein the optimum exposure time is indicated in automatic response to manual selection of the aperture size or vice versa, and wherein the aperture size can be selected by hand, either independently of or by way of a photosensitive exposure meter.

An additional object of the invention is to provide a novel electrical delay circuit for the shutter in the exposure control of the above-outlined character.

A concomitant object of the invention is to provide an exposure control wherein manual selection of exposure time automatically influences the sensitivity of the exposure meter for the diaphragm.

Still another object of the invention is to provide an exposure control wherein a single member suffices to effect manual selection of the exposure time or manual selection of aperture size.

An ancillary object of our invention is to provide an exposure control wherein the exposure time and/or the aperture size can be selected as a function of scene brightness.

A further object of the invention is to provide an exposure control wherein the exposure time can be selected by hand and the aperture size can be selected automatically as a function of scene brightness as well as a function of the manually selected exposure time, or vice versa.

Another object of the invention is to provide an exposure control which can be used in still cameras or in motion picture cameras, which can be installed in cameras that use different types of film, and which can comprise any one of many types of shutters and/or diaphragms.

The improved exposure control comprises an adjustable shutter with one, two or more blades to furnish a plurality of exposure times (e.g., exposure times from one five-hundredths second to 16 seconds), an adjustable electrical delay circuit operative to adjust the shutter and to thus select the exposure time, an adjustable diaphragm with one, two or more vanes which can furnish a plurality of aperture sizes, exposure meter means for adjusting the diaphragm so as to select the aperture size, at least when the aperture size is selected automatically as a function of scene brightness, the exposure meter means having a range of sensitivities, adjustable regulating means for selecting the sensitivity of the exposure meter means, and manually operated selector means for adjusting the regulating means and the delay circuit so that the sensitivity of the exposure meter means is changed as a function of the exposure time selected by the selector means in response to appropriate adjustment of the delay circuit. The exposure meter means may comprise a suitable light meter (e.g., a conventional moving coil instrument) whose output member or members can be coupled directly to the diaphragm or effect adjustments of the diaphragm by way of a mechanism which may include a detector arranged to scan the position of the output member in response to actuation of the shutter release trigger.

The regulating means for adjusting the sensitivity of the exposure meter means may include a single variable resistor in the circuit of the exposure meter means or a set of fixed resistors one of which is connected in the circuit of the exposure meter means in each of several positions of the selector means. The same applies for the adjustment of the delay circuit in response to movement of the selector means. Alternatively, the regulating means for changing the sensitivity of the exposure meter means may include a mask, filter or an auxiliary diaphragm which changes the amounts of scene light that can reach a photosensitive receiver in the circuit of the exposure meter means in response to manual displacement of the selector means.

If the exposure control comprises second manually operated selector means for adjusting the diaphragm independently of the exposure meter means, such second selector means may be provided with or can actuate locking means to prevent the exposure meter means from adjusting the diaphragm when the latter is to be adjusted by the second selector means. It is also possible to employ manually operated second selector means for adjusting the diaphragm by way of the exposure meter means.

In accordance with a further feature of our invention, a single selector means is movable by hand between one or more first positions in which it adjusts the regulating means and the delay circuit and one or more second positions in which it adjusts the diaphragm. The delay circuit then comprises a photosensitive receiver which determines the exposure time as a function of scene brightness when the selector means is in one of its second positions to determine a desired aperture size. When the selector means is moved from second to first position, it adjusts the delay circuit to determine a desired exposure time and simultaneously connects the photosensitive receiver only in the circuit of the exposure meter means to insure that the aperture size is determined automatically as a function of scene brightness and also as a function of the manually selected exposure time.

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
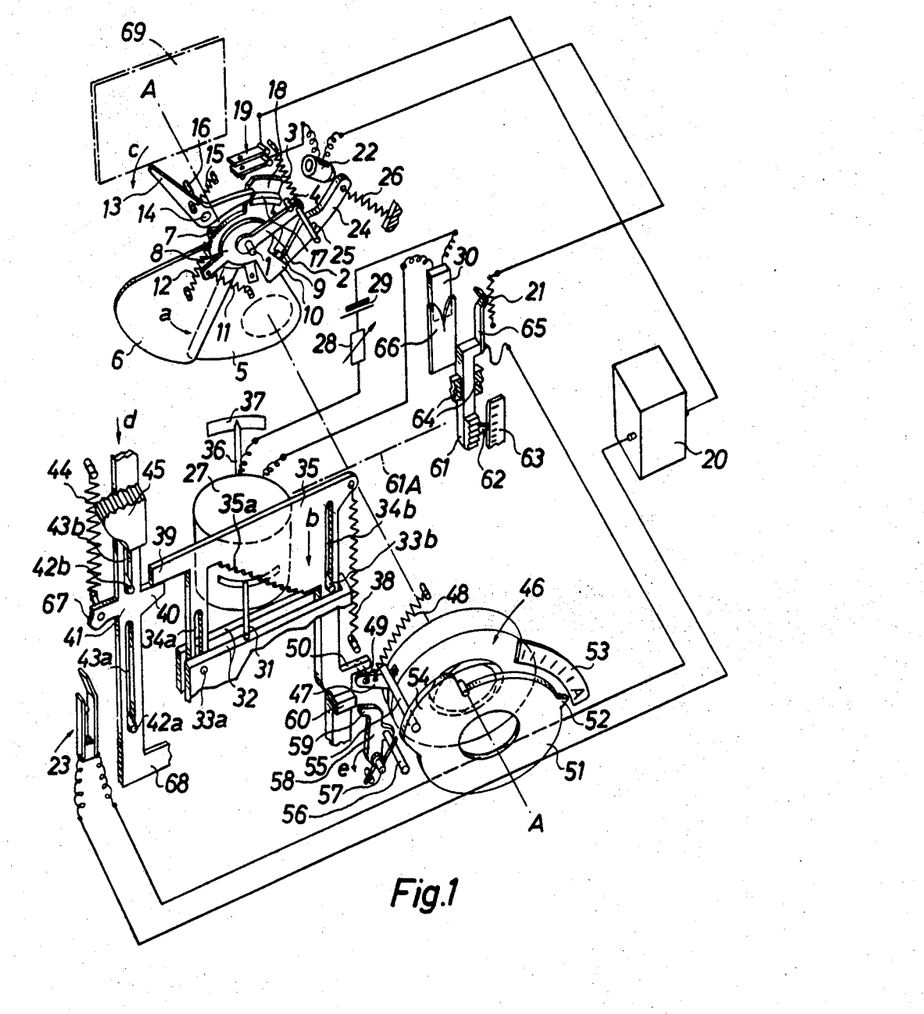
FIG. 1 is a diagrammatic exploded perspective view of an exposure control which embodies one form of our invention.

FIG. 1 illustrates an exposure control which is embodied in a still camera and comprises an adjustable shutter having a shaft 1 which is rigid with a cocking lever 2. The latter is biased by a helical return spring 3 which tends to maintain it in abutment with a fixed stop 4. The shaft 1 further supports two setting rings 7, 8 which are free to rotate thereon and are respectively coupled with shutter blades 5, 6. The rings 7, 8 are provided with bent over lugs (not shown) which extend into suitable openings of the respective blades 5, 6 in a manner well known from the art of shutters. The leading setting ring 7 has a bent over motion-transmitting projection 9 which extends into the path of movement of the cocking lever 2 and serves to turn the ring 7 to cocked position in response to pivoting of the lever 2 against the opposition of the return spring 3. The projection 9 then abuts against a motion-receiving projection 10 of the trailing setting ring 8 so that the latter is cocked with the leading setting ring 7. The rings 7, 8 are respectively biased to uncocked positions by helical return springs 12, 11.

A first blocking lever 13 serves to hold the leading setting ring 7 in cocked position. The blocking lever 13 is mounted on a fixed shaft 14 and is biased by a spring 15 which urges it against a stationary stop pin 16. Such blocking position of the lever 13 is shown in FIG. 1. The lever 13 then engages a projection 17 of the leading setting ring 7 and holds the latter against rotation toward uncocked position (arrow a). The leading setting ring 7 is further provided with an actuating member or trip 18 which can close a normally open control switch 19 forming part of an electrical delay circuit. This delay circuit further comprises a switching unit 20 which is connected to a suitable source of energy and preferably comprises a set of transistors and an R-C unit of known design. Still further, the delay circuit comprises a variable resistor 21, an electromagnet 22 and a master switch 23. The electromagnet 22 controls a second blocking lever 24 which holds the trailing setting ring 8 in cocked position. The lever 24 is turnable on a fixed shaft 25 and is biased by a helical return spring 26. FIG. 1 shows the lever 24 in blocking position in which it extends into the path of movement of the projection 10 on the trailing setting ring 8 to hold the latter against rotation toward uncocked position (arrow a). When the shutter is open, it permits scene light to enter the camera along the path A-A and to impinge against a film which is located in a film window 69.

The exposure control of FIG. 1 further comprises an exposure meter having a light meter here shown as a moving coil instrument 27 in series with a variable resistor 28 which is adjustable as a function of one or more factors influencing the exposure, for example, as a function of the film speed. Furthermore, the exposure meter comprises a battery 29 or an analogous source of electrical energy and a photosensitive receiver 30, e.g., a single photosensitive resistor. The exposure meter shown in FIG. 1 constitutes but one of several exposure meters which can be used in the exposure control of the present invention.

The moving coil instrument 27 has an output member or needle 31 which is movable along a fixed back support or anvil 32. The position of the needle 31 is a function of scene brightness and such position can be detected by a scanning member or detector 35 having a stepped scanning face 35a which can urge the needle 31 against the anvil 32. The detector 35 has elongated slots 34a, 34b for fixed guide pins 33a, 33b and is biased downwardly by a helical spring 38. The moving coil instrument 27 has a second output member or index 36 which is movable along a fixed scale 37. The latter is graduated to indicate various diaphragm aperture sizes and/or exposure times.

The aforementioned spring 38 tends to move the detector 35 in the direction indicated by arrow b, i.e., to move the scanning face 35a into engagement with the needle 31 of the moving coil instrument 27. The detector 35 is normally held against movement in such direction by a shutter release member or trigger 41 which comprises an arm 40 abutting against an arm 39 of the detector 35. The trigger 41 is biased upwardly by a strong helical return spring 44 whose bias is stronger than that of the spring 38. Elongated slots 43a, 43b of the trigger 41 receive fixed guide pins 42a, 42b which permit the trigger to move in or counter to the direction indicated by arrow d. The trigger 41 has a knob 45 which can be depressed by hand to move it against the opposition of the spring 44 (arrow d). When the operator removes his or her finger from the knob 45, the spring 44 contracts and maintains the trigger 41 in the illustrated idle position in which the arm 40 holds the detector 35 in retracted position and stresses the spring 38. The scanning face 35a of the detector 35 is then spaced from the needle 31 of the moving coil instrument 27.

The exposure control also comprises an adjustable iris diaphragm 46 having an adjusting ring (not shown) provided with an arm 47 which is biased by a helical spring 48. The spring 48 tends to maintain the vanes of the diaphragm 46 in an end position, for example, in a position in which the vanes define an aperture of maximum size. The arm 47 is provided with a pin 49 which can be moved by an arm 50 of the detector 35 to effect automatic setting of the aperture size. The axis of the diaphragm 46 coincides with the path A-A. The aforementioned adjusting ring is coupled to the vanes (not shown) which define an aperture whose size is a function of the angular position of the arm 47. It is clear that the diaphragm 46 can be replaced by a simpler or by a more sophisticated diaphragm.

The exposure control also comprises means for permitting manual determination of the aperture size. Such means is provided to enhance the versatility of the exposure control and comprises a selector 51 which can be turned by hand and has an index or pointer 52 adjacent to a fixed scale 53 whose graduations indicate various aperture sizes. The scale 53 further comprises a symbol A which registers with the pointer 52 when the exposure control is set for automatic setting of the aperture size, i.e., when the aperture size is determined by the arm 50 of the detector 35 by way of the pin 49 on the arm 47. The selector 51 has a cam 54 and a motion-transmitting post 55 adapted to engage the arm 47 on the adjusting ring in the diaphragm 46. In order to prevent unintentional changes in the setting of the diaphragm, the selector 51 is preferably provided with a spring-biased detent structure (not shown) or is mounted for rotation with considerable friction so that it stays in selected angular position. When the aperture size is determined by the selector 51, the cam 54 engages a follower 56 on a locking lever 58 which is turnable on a fixed shaft 57. An arm 59 of the locking lever 58 then enters the path of an extension 60 on the detector 35 and prevents the arm 50 of this detector from reaching the pin 49 of the arm 47. Thus, the automatic means for selecting the aperture size is ineffective when the user decides to select the aperture size by hand. The detector 35 provides an operative connection between the needle 31 and the arm 47 of the diaphragm 46, and this operative connection is effective to determine the aperture size only when the selector 51 is moved to a position in which the pointer 52 registers with the symbol A on the scale 53. In each other position of the pointer 52, the aperture size depends on the position of the selector 51.

Still further, the exposure control comprises a manually operated selector 61 for exposure time. This selector 61 has an index or pointer 62 which is movable along a fixed scale 63 having graduations indicating various exposure times. The selector 61 is reciprocable in ways 64 but it is equally possible to employ a selector which performs a purely angular movement (about an axis coinciding with the path A–A) or a composite partly angular and partly translatory movement. The selector 61 carries the sliding contact 65 of the aforementioned variable resistor 21 which forms part of the delay circuit. It is clear that the variable resistor 21 can be replaced by a set of two, three or more fixed resistors one of which is connected in the delay circuit in each of several positions of the selector 61 and each of which adjusts the delay circuit in such a way that the shutter furnishes a different exposure time. The selector 61 further carries an adjustable regulating member here shown as a mask 66 which can cover or uncover larger or smaller portions of the photosensitive receiver 30. The mask 66 can be replaced by other types of regulating members, e.g., by a grey filter or by an auxiliary diaphragm of known design. The purpose of the mask 66 (or of an equivalent adjustable regulating member) is to change the sensitivity of the exposure meter 27—30. The same result can be achieved if the moving coil instrument 27 is turnable in its entirety as a function of changes in the position of the selector 61. The broken line 61A indicates a coupling between the selector 61 and the housing of the instrument 27; this coupling can be used as a substitute for the mask 66.

The aforementioned shutter release trigger 41 is provided with two actuating members 67, 68. The actuating member 67 is a trip which closes the master switch 23 when the trigger 41 is caused to move in the direction indicated by arrow $d$ on application of finger pressure against the knob 45. The master switch 23 is closed by the trip 67 when the scanning face 35a of the detector 35 biases the needle 31 of the moving coil instrument 27 against the anvil 32. The actuating member 68 serves to turn the blocking lever 13 for the leading shutter setting ring 7 in the direction indicated by arrow $c$ shortly before the trigger 41 assumes its lower end position, i.e., after the needle 31 is clamped by the scanning face 35a.

The operation is as follows:

Prior to making an exposure with automatic selection of aperture size, the user shifts the selector 61 (if necessary) to adjust the resistance of the resistor 21 in the delay circuit and to thus select an appropriate exposure time. Such selection is facilitated by the scale 63 whose graduations indicate various exposure times. The selector 61 then maintains the sliding contact 65 of the variable resistor 21 in a preselected position. This variable resistor 21 may form an element of the aforementioned R-C unit in the switching unit 20; such R-C unit determines the exposure time. The selector 61 also adjusts the position of the regulating member or mask 66 with reference to the photosensitive receiver 30 to thereby influence the sensitivity of the exposure meter. In other words, the position of the needle 31 and index 36 changes when the position of the mask 66 changes even if the scene brightness remains unchanged because the sensitivity of the exposure meter is changed by the mask 66. By looking at the scale 37, the user can read the optimum aperture size for the particular scene brightness and for the particular (preselected) exposure time. Such aperture size is then selected in a fully automatic way through the intermediary of detector 35, its arm 50, pin 49 and arm 47 of the adjusting ring in the diaphragm 46. The selector 51 is ineffective, i.e., its pointer 52 registers with the symbol A on the scale 53. The user then simply depresses the trigger 41 in the direction indicated by arrow $d$ so that the spring 38 is free to move the detector 35 downwardly whereby the scanning face 35a detects the angular position of the needle 31 and causes the detector 35 to come to a halt in a position which is a function of scene brightness. Thus, the extent to which the arm 50 of the detector 35 turns the arm 47 of the adjusting ring in the diaphragm 46 is also a function of scene brightness. The arm 40 of the trigger 41 moves away from the arm 39 of the detector 35 when the latter comes to a halt in response to engagement of its tracking face 35a with the needle 31. As the trigger 41 continues to advance in the direction indicated by arrow $d$, the trip 67 closes the master switch 23 and closes the latter so as to prepare the delay circuit for operation. The descending trigger 41 finally causes its actuating member 68 to pivot the blocking lever 13 in the direction indicated by arrow $c$ whereby the latter moves away from the projection 17 of the leading setting ring 7 which turns under the action of the return spring 12 (arrow $a$). The leading shutter blade 5 also turns in the direction indicated by arrow $a$ and moves away from the path A–A so that scene light can reach an unexposed film frame in the window 69. As the leading setting ring 7 turns in a counterclockwise direction, its trip 18 closes the control switch 19 to complete the delay circuit and to thus determine the beginning of the interval during which the shutter remains open. The length of this interval depends on the selected resistance of the variable resistor 21 and, when the interval elapses, the electromagnet 22 is energized to attract its armature (blocking lever 24) against the opposition of the spring 26 whereby the lever 24 releases the projection 10 of the trailing setting ring 8 so that this ring rapidly turns in the direction indicated by arrow $a$ (under the action of return spring 11) and moves the trailing shutter blade 6 across the path A–A to close the shutter.

If the user of the camera wishes to select the aperture size independently of the exposure meter 27—30 and irrespective of whether the exposure is to be made in artificial light or in daylight, the selector 61 is again moved to a desired position to select the exposure time by adjusting the resistor 21 in the delay circuit. In the next step, the user turns the selector 51 so as to place the pointer 52 into registry with a desired graduation on the scale 53, i.e., away from registry with the symbol A. Such turning of the selector 51 results in adjustment of the diaphragm 46 by way of the post 55 and arm 47 of the adjusting ring. When the post 55 engages the arm 47, the cam 54 engages the follower 56 and moves the arm 59 of the locking lever 58 into the path of the extension 60 on the detector 35 (arrow $e$) to thus prevent the detector from causing any angular displacement of the arm 47. In other words, the user can override the operative connection (detector 35) which selects the aperture size as a function of scene brightness when the pointer 52 registers with the symbol A on the scale 53. The trigger 41 is then depressed in the direction indicated by arrow $d$. The arm 59 of the locking lever 58 prevents the spring 38 from moving the tracking face 35a of the detector 35 against the needle 31 so that the latter is not biased against the anvil 32. Thus, the exposure meter 27—30 is ineffective insofar as the adjustment of the aperture size is concerned but the index 36 is free to indicate the optimum aperture size. The exposure is made in the same way as described above, i.e., the trip 67 of the trigger 41 closes the master switch 23, the actuating member 68 of the trigger then disengages the blocking lever 13 from the leading setting ring 7 to open the shutter, and the electromagnet 22 is energized with a delay determined by the position of the sliding contact 65 of the variable resistor 21 to disengage the blocking lever 24 from the projection 10 of the trailing setting ring 8 and to permit rapid closing of the shutter by way of the return spring 11.

The provision of the selector 51 renders it possible to employ the improved exposure control in cameras which are used in daylight or in artificial light. Also, the selector 51 renders it possible to use the camera embodying the exposure control of FIG. 1 with different types of illuminating arrangements, for example, with a flash unit, with an electronic flash and/or with others.

Another important feature of the exposure control shown in FIG. 1 resides in the provision of scales 37 and 63. The scale 37 cooperates with the index 36 of the light meter 27 to indicate to the user that aperture size which is selected automatically as a function of scene brightness and in dependency on a manually selected exposure time. The operator of the camera is then in a position to use his or her own judgment and to intentionally change the aperture size by way of the selector 51 if it is desired to produce a special effect or to take into consideration certain other factors which might influence the quality of exposures, for example, when the subject or scene is located between the sun and the camera.

Another important advantage of the scales 37, 63 is that each thereof can indicate a range of different exposure values, i.e., that readings indicating exposure times and aperture sizes need not be furnished by a single scale which might occupy too much room and is often more difficult to read than a pair of separate scales.

Figure 2:
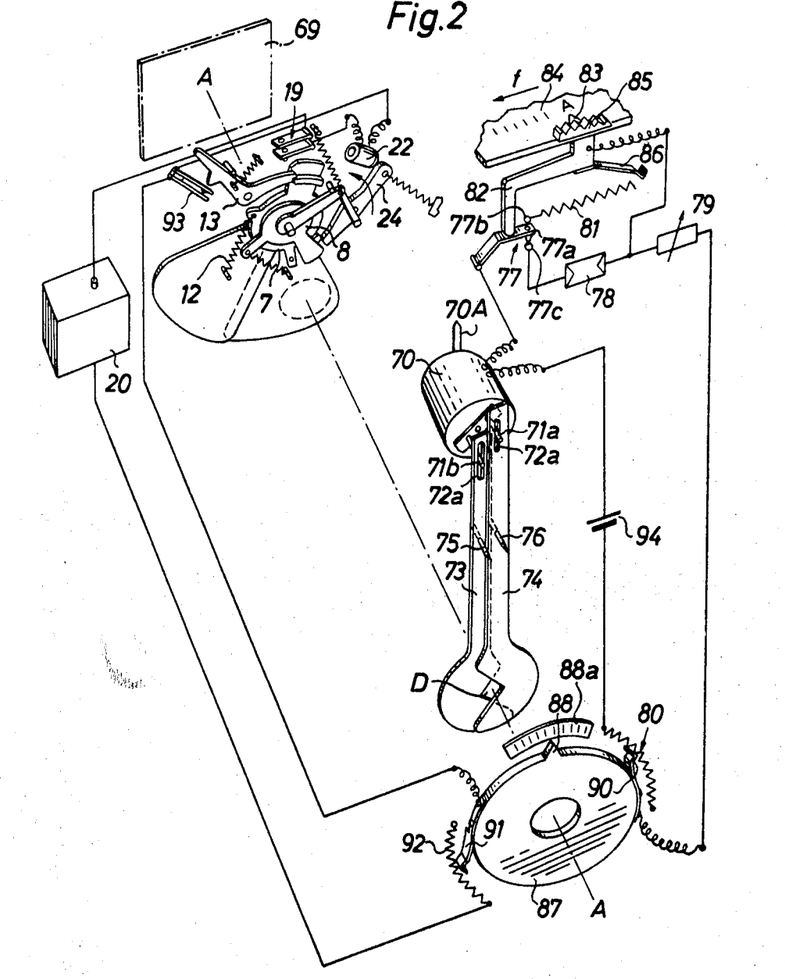
FIG. 2 is a similar exploded perspective view of a second exposure control.

The adjustable shutter in the modified exposure control of FIG. 2 is identical with the previously described shutter and its parts are denoted by similar reference numerals. The adjustable delay circuit of the modified exposure control comprises a switching unit 20, a control switch 19 and an electromagnet 22 which can move the blocking lever 24 for the trailing setting ring 8 away from blocking position. The adjustable exposure meter of the exposure control shown in FIG. 2 comprises a modified light meter or moving coil instrument 70 having an output portion including two motion-transmitting pins 71a, 71b extending into elongated slots 72a, 72b provided in the upper end portions of two adjustable diaphragm vanes 73, 74 which are respectively fulcrumed at 75, 76. The lower portions of the vanes 73, 74 define an aperture D whose size is a function of scene brightness when the camera including the exposure control of FIG. 2 is set for automatic operation. The electric circuit of the instrument 70 includes a two-way switch 77 which can connect the instrument 70 in series with a photosensitive receiver 78 (preferably a resistor), a first variable resistor 79, a second variable resistor 80, and a battery 94. The movable contact 77a of the switch 77 can change its position to disconnect the receiver 78 and to replace this receiver with a third variable resistor 81. Thus, when the receiver 78 is in series with the instrument 70, the third variable resistor 81 is disconnected, and vice versa. The movable contact 77a is elastic and tends to assume a position in which it abuts against a first fixed contact 77b to thereby disconnect the receiver 78. When the camera is set for automatic determination of the aperture size as a function of scene brightness, the contact 77a is biased against a second fixed contact 77c of the switch 77 by a selector or trip 82 which can be displaced by a handgrip portion or knob 85 having a pointer 83 movable into registry with selected graduations of a fixed scale 84. The graduations of the scale 84 indicate various aperture sizes. When the selector 82 assumes the position shown in FIG. 2, the receiver 78 is in series with the moving coil instrument 70 and the resistor 81 is disconnected. The selector 82 further carries the sliding contact 86 of the resistor 81. It will be seen that the contact 86 is disengaged from the wire of the resistor 81 when the selector 82 maintains the movable contact 77a in engagement with the second fixed contact 77c, i.e., the resistance of the resistor 81 is then infinitely large. The sliding contact 86 engages the wire of the resistor 81 when the selector 82 assumes one of several positions in which the contact 77a of the switch 77 is free to engage the first fixed contact 77b.

The exposure control of FIG. 2 further comprises a manually operated exposure time selector 87 which is rotatable about an axis coinciding with the direction (A–A) in which the scene light can reach an unexposed film frame in the window 69. The selector 87 has an index or pointer 88 movable along a fixed scale 88a whose graduations indicate various exposure times. The exposure time selector 87 further carries a sliding contact 90 forming part of the aforementioned second variable resistor 80 and a sliding contact 91 which forms part of a fourth variable resistor 92. The resistor 92 corresponds to the resistor 21 of FIG. 1 and serves to determine the exposure time. The master switch of the delay circuit including the parts 19, 20, 22, 92 is shown at 93. This master switch is closed by the blocking lever 13 of the shutter when the lever 13 releases the leading setting ring 7 for movement from cocked position under the action of return spring 12.

The first variable resistor 79 is adjusted when the user inserts a different type of film to account for the sensitivity of freshly inserted film. The exposure time is selected by the selector 87 and such selection is facilitated by the pointer 88 and scale 88a which latter is calibrated to indicate various exposure times. The exposure time depends on the angular position of the sliding contact 91 in the variable resistor 92 of the delay circuit. The selector 87 also changes the sensitivity of the exposure meter because it changes the angular position of the sliding contact 90 in the second variable resistor 80 which is installed in the circuit of the moving coil instrument 70. Thus, the size of the aperture D is changed whenever the user decides to change the angular position of the selector 87, even if the scene brightness remains unchanged. The aperture size selected by the selector 82 or as a function of scene brightness (as modified by the angular position of the selector 87) can be detected by providing the instrument with an index 70A corresponding to the index 36 shown in FIG. 1. The variable resistor 80 is an equivalent of the regulating mask 66 in the exposure control of FIG. 1, i.e., this resistor changes the sensitivity of the exposure meter as a function of angular movement of the selector 87.

The exposure is thereupon made in the same way as described in connection with FIG. 1, with the sole exception that the shutter release trigger 41 (not shown in FIG. 2) does not have a trip 67 because the master switch 93 is closed by the blocking lever 13 when the latter is moved from blocking position by the actuating member 68 (see FIG. 1).

If the user wishes to select the aperture size by hand, i.e., not as a function of scene brightness (receiver 78), the selector 82 is moved by knob 85 in the direction indicated by arrow f to move the pointer 83 into registry with a selected graduation on the fixed scale 84. The movable contract 77a of the switch 77 then returns into engagement with the first fixed contact 77b so that the variable resistor 81 replaces the receiver 78. The sliding contact 86 then engages the wire of the resistor 81. The selected resistance of the resistor 81 determines the aperture size, i.e., the angular position of the output member of the moving coil instrument 70 (pins 71a, 71b ). In this embodiment of our invention, the manually operated selector 82 can select the aperture size by way of the exposure meter. This is due to the fact that the output portion (pins 71a, 71b ) of the light meter 70 is directly connected with the adjustable vanes 73, 74 of the diaphragm.

Figure 3:
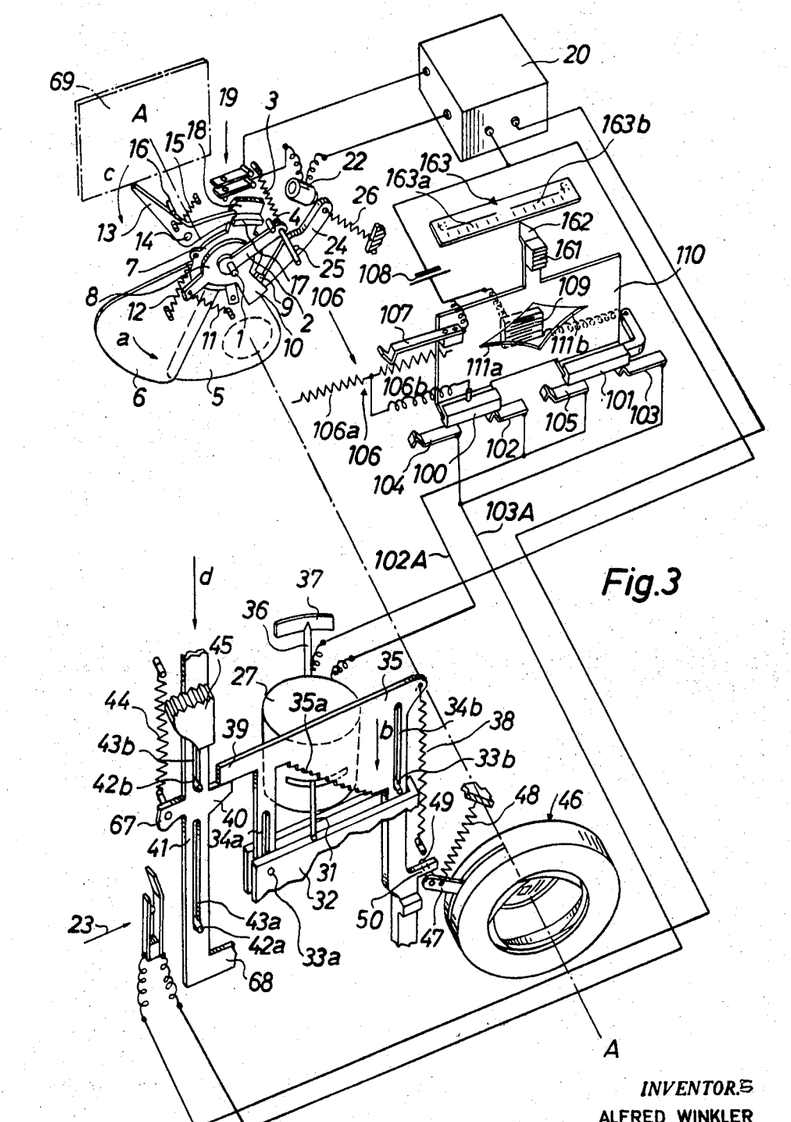
FIG. 3 is a similar exploded perspective view of a third exposure control.

Referring finally to FIG. 3, there is shown a third exposure control wherein the adjustable shutter is identical with that of FIG. 1, and, therefore, the parts of this shutter are denoted by similar reference numerals. The same applies for the adjustable iris diaphragm 46, adjustable delay circuit, shutter release trigger 41 and certain components of the exposure meter. The latter comprises a moving coil instrument 27 with output members 31, 36. The operative connection between the output member 31 and diaphragm 46 comprises a detector 35, an anvil 32 and the detector arm 50 which can engage the pin 49 to turn the arm 47 of the adjusting ring in the diaphragm 46. A separate selector 51 is not needed in the exposure control of FIG. 3. The diaphragm 46 can be replaced by other types of diaphragms and the moving coil instrument 27 can be replaced by a light meter of the type shown in FIG. 2, i.e., by an instrument whose output portion can be directly coupled to one or more vanes of a diaphragm.

A single manually operated selector 161 for exposure time and aperture size comprises an index or pointer 162 which is movable along a fixed scale 163 having two sections 163a, 163b which respectively carry graduations indicating various exposure times and various aperture sizes. The selector 161 is reciprocable in ways (not shown) corresponding to the ways 64 of FIG. 1. However, and as mentioned in connection with FIG. 1 for the selector 61, the selector 161 can be replaced by a member which is turnable about an axis coinciding with the path A-A or by a member which can perform a composite angular and translatory movement.

The selector 161 is rigid with two sliding contacts 100, 101 which respectively cooperate with pairs of fixed contacts 102, 104 and 103, 105. The contacts 100—105 together form a switchover means. When the pointer 162 registers with a graduation on the scale section 163a, the sliding contacts 100, 101 respectively engage the fixed contacts 104, 105. When the pointer 162 registers with a graduation of the scale section 163b, the sliding contacts 100, 101 respectively engage the fixed contacts 102, 103. The fixed contacts 102, 105 are connected to one terminal of the moving coil instrument 27 by a common conductor 102A. The fixed contacts 103, 104 are connected with one terminal of the master switch 23 by a common conductor 103A. Thus, the contacts 102, 105 are connected in the circuit of the exposure meter and the contacts 103, 104 are connected in the delay circuit. The sliding contact 100 is connected with a variable resistor 106 having two resistor portions 106a, 106b and a sliding contact portion 107. The latter is connected to and moves with the selector 161. FIG. 3 illustrates the selector 161 in a first or initial position in which the operator has selected the aperture size by hand. One terminal of the moving coil instrument 27 is connected with one pole of a battery 108 by way of the fixed contact 102, sliding contact 100, resistor portion 106b, and sliding contact portion 107. The other pole of the battery 108 is connected directly to the other terminal of the instrument 27. The angular position of the output member 31 (and of output member 36) is a function of the resistance of the resistor portion 106b in the resistor 106, i.e., a function of the position of the pointer 162 with reference to the scale section 163b.

The sliding contact 101 is connected with one terminal of a photosensitive receiver 109. The other terminal of the receiver 109 is connected with the battery 108. The receiver 109 is a resistor. In that position of the selector 161 which is shown in FIG. 3, one terminal of the master switch 23, fixed contact 103, sliding contact 101, receiver 109 and battery 108 are connected to one terminal of the switching unit 20 in the delay circuit. Another terminal of the switching unit 20 is connected directly to the other terminal of the master switch 23.

The selector 161 is further provided with or connected to an opaque regulating mask 110 which can overlie larger or smaller portions of the photosensitive receiver 109. The mask 110 has a cutout or window having two tapering trumpetlike or hornlike end portions 111a, 111b. The position of the cutout is such that the receiver 109 is fully exposed to scene light when the pointer 162 of the selector 161 registers with the innermost graduation on the scale section 163a or 163b, i.e., in two adjacent initial positions of the selector 161. The end portion 111a or 111b reduces the amount of scene light which can reach the receiver 109 when the pointer 162 is moved into registry with other than the innermost or initial graduation on the scale section 163b or 163a. The end portion 111a is effective when the pointer 162 registers with a graduation on the scale section 163b (aperture sizes) and the end portion 111b is effective when the pointer 162 registers with a graduation on the scale section 62 163a (exposure times). It is clear that the mask 110 can be replaced by a grey wedge, by an auxiliary diaphragm or by another suitable regulating device for the sensitivity of the exposure meter.

In order to account for sensitivities of different types of film which are to be used in a camera embodying the exposure control of FIG. 3, the structure shown in FIG. 3 can be provided with a supplementary mask (not shown) for the photosensitive receiver 109 or with a variable resistor (not shown) in series with the receiver 109. Such resistor would perform the same function as the resistor 28 of FIG. 1. Alternatively, the entire moving coil instrument could be turned about the axis of its housing to thereby adjust the exposure meter as a function of film speed.

The actuating member 68 of the trigger 41 again serves to move the blocking lever 13 away from the projection 17 of the leading setting ring 7 (arrow c), and the trip 67 of the trigger 41 again serves to close the master switch 23 prior to engagement of the actuating member 68 with the blocking lever 13. The trip 67 closes the master switch 23 at a time when the tracking face 35a of the detector 35 already clamps the output member 31 of the moving coil instrument 27 against the anvil 32.

The operation of the exposure control shown in FIG. 3 is as follows:

Prior to making an exposure with manual selection of the aperture size, the operator of the camera moves the single selector 161 by hand so as to place the pointer 162 into registry with a desired graduation on the scale section 163b. The sliding contact portion 107 of the variable resistor 106 then engages a predetermined point of the resistor portion 106b whereby the output member 31 of the moving coil instrument 27 assumes an angular position which is a function of the resistance of the resistor 106. At the same time, the regulating mask 110 of the selector 161 overlies a predetermined portion of the photosensitive receiver 109 so that the delay circuit is adjusted as a function of the preselected aperture size.

The operator then exerts pressure upon the knob 45 (arrow d) to move the trigger 41 from idle position and to permit the detector 35 to move downwardly (arrow b) under the action of the spring 38. The arm 40 of the trigger 41 moves away from the arm 39 of the detector 35 when the latter's scanning face 35a engages the output member 31 and presses it against the anvil 32. The arm 50 of the detector 35 then maintains the arm 47 of the adjusting ring in the diaphragm 46 in an angular position which is a function of the angular position of the output member 31, i.e., a function of the position of the sliding contact portion 107 in the variable resistor 106.

The trigger 41 continues to move downwardly (arrow d) and its trip 67 closes the normally open master switch 23 to prepare the delay circuit for operation. As the trigger 41 continues to move toward its lower end position, its actuating member 68 turns the blocking lever 13 in the direction indicated by arrow c and thus permits the leading setting ring 7 to move from cocked position (arrow a) under the action of the return spring 12. The leading shutter blade 5 moves away from the path A-A and permits scene light to travel along the path A-A and to expose a film frame in the window 69. As the leading setting ring 7 begins to move in the direction indicated by arrow a, its trip 18 closes the control switch 19 to complete the delay circuit. The delay with which the electromagnet 22 of the delay circuit is energized to attract the blocking lever 24 and to thus permit movement of the trailing setting ring 8 to uncocked position (arrow a) depends on the resistance of the receiver 109, i.e., on the intensity of scene light. As the trailing ring 8 turns under the bias of spring 11, the trailing shutter blade 6 moves across the path A-A and closes the shutter. This completes the exposure.

If the user thereupon decides to make an exposure with manually selected exposure time, the shutter is cocked in the first step so that the blades 5, 6, setting rings 7, 8 and blocking levers 13, 24 again assume the positions shown in FIG. 3. The user then shifts the single selector 161 in a sense to move the pointer 162 into registry with a desired graduation on the scale section 163a. The sliding contacts 100, 101 are then disengaged from fixed contacts 102, 103 and respectively engage the fixed contacts 104, 105. The sliding contact portion 107 of the variable resistor 106 engages a predetermined point of the fixed resistor portion 106a. The master switch 23 is then connected with the switching unit 20 by way of the fixed resistor portion 106a and battery 108. The length of exposure time is a function of the resistance of the resistor portion 106a, i.e., a function of the position of the selector 161.

The sliding contact 101 of the selector 161 then engages the fixed contact 105 which connects one terminal of the moving coil instrument 27 with one pole of the battery 108 by way of the receiver 109. The other pole of the battery 108 is permanently connected with the other terminal of the instrument 27. Thus, the angular position of the output member 31 (and of the output member 36) is then a function of the scene brightness and a function of the position of the regulating mask 110 with reference to the receiver 109. The mask 110 modifies the aperture size in dependency on the manually selected exposure time.

The exposure is thereupon made in the same way as described hereinbefore, i.e., the trigger 41 is moved in the direction indicated by arrow $d$ to permit adjustment of the diaphragm 46 by way of the arm 50 on the detector 31, the trip 67 closes the master switch 23, and the actuating member 68 disengages the blocking lever 13 from the leading setting ring 7 of the shutter.

It is clear that each of the improved exposure controls can be modified in a number of ways without departing from the spirit of our invention. For example, the two-blade shutter of FIGS. 1 to 3 can be replaced by many other types of shutters. Also, the delay circuits shown in FIGS. 1 to 3 can be replaced by other types of delay circuits with or without the switching unit 20.

The main difference between the exposure controls of FIGS. 1 and 2 on the one hand and the exposure control of FIG. 3 on the other hand is that the latter exposure control comprises means for automatically adjusting the delay circuit as a function of scene brightness when the aperture size is selected by hand, or vice versa. In the exposure controls of FIGS. 1 and 2, the exposure time is selected by hand, namely, by moving the selector 61 of FIG. 1 with reference to the ways 64 or by turning the selector 87 about an axis which coincides with the direction indicated by the line A—A. Thus, the exposure control of FIG. 3 is more versatile and renders it possible to make satisfactory exposures in a large number of different situations. Furthermore, the exposure control of FIG. 3 is more compact than the exposure controls of FIGS. 1 and 2 and comprises a lesser number of parts because a single selector 161 suffices to effect manual selection of exposure times or manual selection of aperture sizes by using a single photosensitive receiver or a single set of such receivers. The receiver 109 of FIG. 3 can be connected in the delay circuit or in the circuit of the exposure meter, depending on the position of the sliding contact 101. The receiver 30, 78 or 109 can be mounted directly in or behind a window of the front wall of the camera housing.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. An exposure control for photographic cameras, comprising an adjustable shutter arranged to furnish a plurality of exposure times; an adjustable electrical delay circuit operative to adjust said shutter so as to select the exposure time; an adjustable diaphragm arranged to furnish a plurality of aperture sizes; exposure meter means operatively connected with and arranged to adjust said diaphragm so as to select the aperture size, said exposure meter means having a range of sensitivities; adjustable regulating means for selecting the sensitivity of said exposure meter means; and manually operated selector means for simultaneously adjusting said regulating means and said delay circuit.

2. An exposure control as defined in claim 1, wherein said exposure meter means comprises a movable output portion which is directly coupled with said diaphragm.

3. An exposure control as defined in claim 1, wherein said exposure meter means comprises a movable output portion and means for adjusting said diaphragm as a function of the position of said output portion.

4. An exposure control as defined in claim 1, wherein said delay circuit comprises variable resistor means, said variable resistor means being adjustable by said selector means.

5. An exposure control as defined in claim 1, wherein said regulating means comprises variable resistor means forming part of said exposure meter means and being adjustable by said selector means.

6. An exposure control as defined in claim 1, further comprising a plurality of resistors each having a different resistance, said selector means comprising means for connecting a selected resistor into said delay circuit to thereby adjust said delay circuit.

7. An exposure control as defined in claim 1, wherein said exposure meter means comprises a second electric circuit and said regulating means comprises a plurality of resistors each having a different resistance, said selector means comprising means for connecting at least one of said resistors into said second circuit in each of several positions of said selector means.

8. An exposure control as defined in claim 1, wherein said exposure meter means comprises a light meter movable between a plurality of positions each of which corresponds to a different sensitivity of said exposure meter means, said selector means comprising means for moving said light meter between said positions.

9. An exposure control as defined in claim 1, wherein said exposure meter means comprises photosensitive receiver means exposed to scene light and said regulating means comprises means for changing the amounts of scene light which can reach said receiver means.

10. An exposure control as defined in claim 1, wherein said exposure meter means comprises a light meter having an output member movable between a plurality of positions each of which represents a different aperture size, and a scale adjacent to said output member and having graduations indicating the aperture sizes represented by said output member.

11. An exposure control for photographic cameras, comprising an adjustable shutter arranged to furnish a plurality of exposure times; an adjustable electrical delay circuit operative to adjust said shutter so as to select the exposure time; an adjustable diaphragm arranged to furnish a plurality of aperture sizes; exposure meter means for adjusting said diaphragm so as to select the aperture size, said exposure meter means having a range of sensitivities; adjustable regulating means for selecting the sensitivity of said exposure meter means; first selector means for adjusting said regulating means and said delay circuit; and manually operated second selector means for adjusting said diaphragm independently of said exposure meter means.

12. An exposure control as defined in claim 11, wherein said second selector means comprises locking means for disconnecting said exposure meter means from said diaphragm, said second selector means being movable between at least one first position in which said locking means disconnects said exposure meter means from said diaphragm and at least one second position in which said diaphragm furnishes an aperture size which is a function of the position of said second selector means.

13. An exposure control for photographic cameras, comprising an adjustable shutter arranged to furnish a plurality of exposure times; an adjustable electrical delay circuit operative to adjust said shutter so as to select the exposure time; an adjustable diaphragm arranged to furnish a plurality of aperture sizes; exposure meter means for adjusting said diaphragm so as to select the aperture size, said exposure meter means having a range of sensitivities; adjustable regulating means for selecting the sensitivity of said exposure meter means; first selector means for adjusting said regulating means and said delay circuit; and manually operated second selector means for adjusting said diaphragm by way of said exposure meter means.

14. An exposure control for photographic cameras, comprising an adjustable shutter arranged to furnish a plurality of exposure times; an adjustable electrical delay circuit operative to adjust said shutter so as to select the exposure time; an adjustable diaphragm arranged to furnish a plurality of aperture sizes; exposure meter means for adjusting said diaphragm so as to select the aperture size, said exposure meter means having a range of sensitivities; adjustable regulating means for selecting the sensitivity of said exposure meter means; and selector means for adjusting said regulating means and said delay circuit, said selector means being movable to and from at least one first position in which it adjusts said regulating means and said delay circuit and at least one second position in which it adjusts said diaphragm.

15. An exposure control as defined in claim 14, wherein said exposure meter means comprises a second electric circuit, said delay circuit including photosensitive receiver means in the first position of said selector means and further comprising switchover means for connecting said receiver means only in said second circuit in the second position of said selector means.

16. An exposure control as defined in claim 15, wherein said switchover means comprises two movable contacts connected with said selector means, one of said contacts being connected with said receiver means and the other contact being connected with an exposure time-determining element of said delay circuit, and a pair of fixed contacts, for each of said movable contacts, one fixed contact of each pair being connected in said delay circuit and the other fixed contact of each pair being connected in said second circuit, said movable contacts being in engagement with a different fixed contact of the respective pair in said first and second positions of said selector means.

17. An exposure control as defined in claim 16, wherein said second circuit comprises a light meter having two terminals one of which is connected with said other fixed contact of each of said pairs of fixed contacts.

18. An exposure control as defined in claim 15, wherein said regulating means comprises a device at least a portion of which is connected for movement with said selector means and is arranged to change the amounts of scene light which can reach said receiver means in different positions of said selector means.

19. An exposure control as defined in claim 18, wherein said selector means is movable between a series of first and second positions and wherein said device is arranged to reduce the amounts of scene light which can reach said receiver means in response to movement of said selector means to successive first and second positions respectively.

20. An exposure control as defined in claim 19, wherein said device is arranged to admit maximum amounts of light to said receiver means in the initial of each of said series of first and second positions of said selector means.

21. An exposure control as defined in claim 20, wherein said initial positions are adjacent to each other.

22. An exposure control as defined in claim 18, wherein said device comprises an opaque mask which is rigid with said selector means and is provided with a window having portions of different area arranged to admit different amounts of scene light to said receiver means in different positions of said selector means.

23. An exposure control as defined in claim 22, wherein said window comprises two tapering end portions.

24. An exposure control as defined in claim 16, wherein said element is a variable resistor having two resistor portions and a sliding contact portion provided on said selector means, said sliding contact portion being in engagement with one of said resistor portions in the first position and with the other resistor portion in the other position of said selector means.

25. An exposure control as defined in claim 24, wherein said selector means is movable between a plurality of first and second positions.